(12) United States Patent
Yim et al.

(10) Patent No.: US 9,013,589 B2
(45) Date of Patent: Apr. 21, 2015

(54) DIGITAL IMAGE PROCESSING APPARATUS AND DIGITAL IMAGE PROCESSING METHOD CAPABLE OF OBTAINING SENSIBILITY-BASED IMAGE

(75) Inventors: Hyun-ock Yim, Seoul (KR); Ji-hyun Goh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 743 days.

(21) Appl. No.: 13/115,323

(22) Filed: May 25, 2011

(65) Prior Publication Data

US 2012/0092515 A1    Apr. 19, 2012

(30) Foreign Application Priority Data

Oct. 14, 2010    (KR) .................. 10-2010-0100328

(51) Int. Cl.
*H04N 5/228* (2006.01)
*H04N 5/232* (2006.01)
*G06F 17/30* (2006.01)
*H04N 5/76* (2006.01)

(52) U.S. Cl.
CPC ...... *H04N 5/23222* (2013.01); *G06F 17/30247* (2013.01); *H04N 5/23293* (2013.01)

(58) Field of Classification Search
USPC ......... 348/191, 222.1, 231.2, 333.02, 333.12, 348/716
See application file for complete search history.

(56) References Cited

U.S. PATENT DOCUMENTS

| | | | | |
|---|---|---|---|---|
| 5,924,087 | A * | 7/1999 | Takahashi et al. | 1/1 |
| 6,301,440 | B1 | 10/2001 | Bolle et al. | |
| 6,657,661 | B1 * | 12/2003 | Cazier | 348/231.2 |
| 7,002,625 | B2 * | 2/2006 | Takahashi | 348/231.2 |
| 8,126,321 | B2 * | 2/2012 | Nagao et al. | 396/49 |
| 2005/0088542 | A1 * | 4/2005 | Stavely et al. | 348/239 |
| 2006/0250507 | A1 * | 11/2006 | Miyajima et al. | 348/231.5 |
| 2007/0147826 | A1 * | 6/2007 | Matsuzaki et al. | 396/287 |
| 2009/0162042 | A1 * | 6/2009 | Wexler et al. | 396/49 |
| 2010/0070501 | A1 * | 3/2010 | Walsh et al. | 707/736 |
| 2010/0077003 | A1 * | 3/2010 | Kondo et al. | 707/780 |
| 2010/0309226 | A1 * | 12/2010 | Quack et al. | 345/634 |
| 2013/0314566 | A1 * | 11/2013 | Walker et al. | 348/231.3 |

FOREIGN PATENT DOCUMENTS

| | | | | |
|---|---|---|---|---|
| JP | 2003-244488 | * | 8/2003 | ............ H04N 5/225 |
| KR | 10-2007-0077247 A | | 7/2007 | |
| KR | 10-2009-0114924 A | | 11/2009 | |

* cited by examiner

*Primary Examiner* — Hung Lam
(74) *Attorney, Agent, or Firm* — Drinker Biddle & Reath LLP

(57) ABSTRACT

A digital image processing method includes obtaining photographing setting information from an input image, obtaining one or more candidate images corresponding to the obtained photographing setting information from a first database that stores candidate images, and determining photographing setting information for a selected candidate image from a second database that stores photographing setting information corresponding to the candidate images. A digital image processing apparatus includes a photographing setting information obtaining unit that obtains photographing setting information from an input image, a candidate image determining unit that determines one or more candidate images corresponding to the obtained photographing setting information from a first database that stores candidate images, and a photographing setting information determining unit that determines photographing setting information corresponding to a selected candidate image from a second database that stores photographing setting information corresponding to the candidate images.

38 Claims, 20 Drawing Sheets

FIG. 5

| GROUP 1 | GROUP 2 | | SUBJECT | | | COLOR | | | FACE | | | EXPOSURE | | |
|---|---|---|---|---|---|---|---|---|---|---|---|---|---|---|
| | | NO | TYPE | POSITION | MOTION | TEMPERATURE | HUE | SATURATION | DETECTION | SIZE | POSITION | LV | TARGET V | GPS |
| CAMERAWORK | OUT FOCUS | 1 | WOMAN | CENTER | 10 | 3000K | 60 | 50 | 1 | 50.50 | 150.150 | 8 | 1200 | 60.30 |
| | | 2 | WATERFALL | TOP-LEFT | 200 | 7000K | 0 | 0 | 0 | 0.0 | 0 | 13 | 1300 | ... |
| | | 3 | PET | RIGHT | 50 | 3500K | 0 | 0 | 0 | 0.0 | 0 | 9 | 1200 | ... |
| | | 4 | – | – | 0 | 5500K | 180 | 90 | 0 | 0.0 | 0 | 15 | 1300 | ... |
| | PAN FOCUS | | | | : | : | : | : | : | : | : | : | : | |
| | CAPTURING MOMENT | | | | : | : | : | : | : | : | : | : | : | |
| | TRACE EXPRESSION | | | | : | : | : | : | : | : | : | : | : | |
| | SILHOUETTE | | | | : | : | : | : | : | : | : | : | : | |
| | ETC. | | | | : | : | : | : | : | : | : | : | : | |
| LENS EFFECT | THE SHIFT | | | | | | | | | | | | | |
| | FISHEYE | | | | | | | | | | | | | |
| | ETC. | | | | | | | | | | | | | |

FIG. 6

| GROUP 1 | GROUP 2 | DATA | NO. 1 | | | DATA | NO. 2 | | |
|---|---|---|---|---|---|---|---|---|---|
| | | | 1 | 2 | 3 | | 1 | 2 | 3 |
| CAMERAWORK | OUT FOCUS | FN | 2 | 2 | 2 | FN | 2 | 2 | 2 |
| | | ISO | 400 | 400 | 400 | ISO | 800 | 3200 | 800 |
| | | SHUTTER | 1/45s | 1/20s | 1/20s | SHUTTER | 1/45s | 1/10s | 1/45s |
| | | FLASH | OFF | OFF | OFF | FLASH | ON | OFF | ON |
| | | PHOTOMETRY | MULTI | SPOT | MULTI | PHOTOMETRY | MULTI | SPOT | SPOT |
| | PAN FOCUS | ⋮ | ⋮ | ⋮ | ⋮ | ⋮ | ⋮ | ⋮ | ⋮ |
| | CAPTURING MOMENT | ⋮ | ⋮ | ⋮ | ⋮ | ⋮ | ⋮ | ⋮ | ⋮ |
| | TRACE EXPRESSION | ⋮ | ⋮ | ⋮ | ⋮ | ⋮ | ⋮ | ⋮ | ⋮ |
| | SILHOUETTE | ⋮ | ⋮ | ⋮ | ⋮ | ⋮ | ⋮ | ⋮ | ⋮ |
| | ETC. | ⋮ | ⋮ | ⋮ | ⋮ | ⋮ | ⋮ | ⋮ | ⋮ |
| LENS EFFECT | THE SHIFT | ⋮ | ⋮ | ⋮ | ⋮ | ⋮ | ⋮ | ⋮ | ⋮ |
| | FISHEYE | ⋮ | ⋮ | ⋮ | ⋮ | ⋮ | ⋮ | ⋮ | ⋮ |
| | ETC. | | | | | | | | |

DIGITAL IMAGE PROCESSING APPARATUS AND DIGITAL IMAGE PROCESSING METHOD CAPABLE OF OBTAINING SENSIBILITY-BASED IMAGE

CROSS-REFERENCE TO RELATED PATENT APPLICATION

This application claims the priority benefit of Korean Patent Application No. 10-2010-0100328, filed on Oct. 14, 2010, in the Korean Intellectual Property Office, the entire disclosure of which is incorporated herein by reference.

BACKGROUND

1. Field of the Invention

Embodiments relate to a digital image processing apparatus and a digital image processing method.

2. Description of the Related Art

Recently, general users desire to obtain artistic and emotional images like images captured by professional photographers. In conventional digital cameras, an automatic mode is used to obtain clear images of a main subject. Thus, users have to adjust various photographing setting values in a manual mode in order to obtain such artistic and emotional images.

SUMMARY

Embodiments can provide a digital image processing apparatus and a digital image processing method that allows a user to easily obtain artistic and emotional images.

According to an embodiment, there is provided a digital image processing method. The method includes obtaining photographing setting information from an input image, obtaining one or more candidate images corresponding to the obtained photographing setting information from a first database that stores a candidate images according to at least one of a candidate image photographing setting information and image effects, and determining photographing setting information for a selected candidate image from the obtained one or more candidate images from a second database that stores photographing setting information corresponding to the candidate images.

According to another embodiment, there is provided a digital image processing apparatus. The digital image processing apparatus includes a photographing setting information obtaining unit that obtains photographing setting information from an input image, a candidate image determining unit that determines one or more candidate images corresponding to the obtained photographing setting information from a first database that stores candidate images according to at least one of candidate image photographing setting information and image effects, and a photographing setting information determining unit that determines photographing setting information corresponding to a selected candidate image from the determined one of the one or more candidate images from a second database that stores photographing setting information corresponding to the candidate images.

BRIEF DESCRIPTION OF THE DRAWINGS

The above and other features and advantages will become more apparent by describing in detail exemplary embodiments with reference to the attached drawings in which:

FIG. 5 is a table for explaining a first database of a digital image processing apparatus, according to an embodiment;

FIG. 6 is a table for explaining a second database of a digital image processing apparatus, according to an embodiment;

DETAILED DESCRIPTION

Now, an exemplary embodiment will be described in detail with reference to the accompanying drawings.

Figure 1:
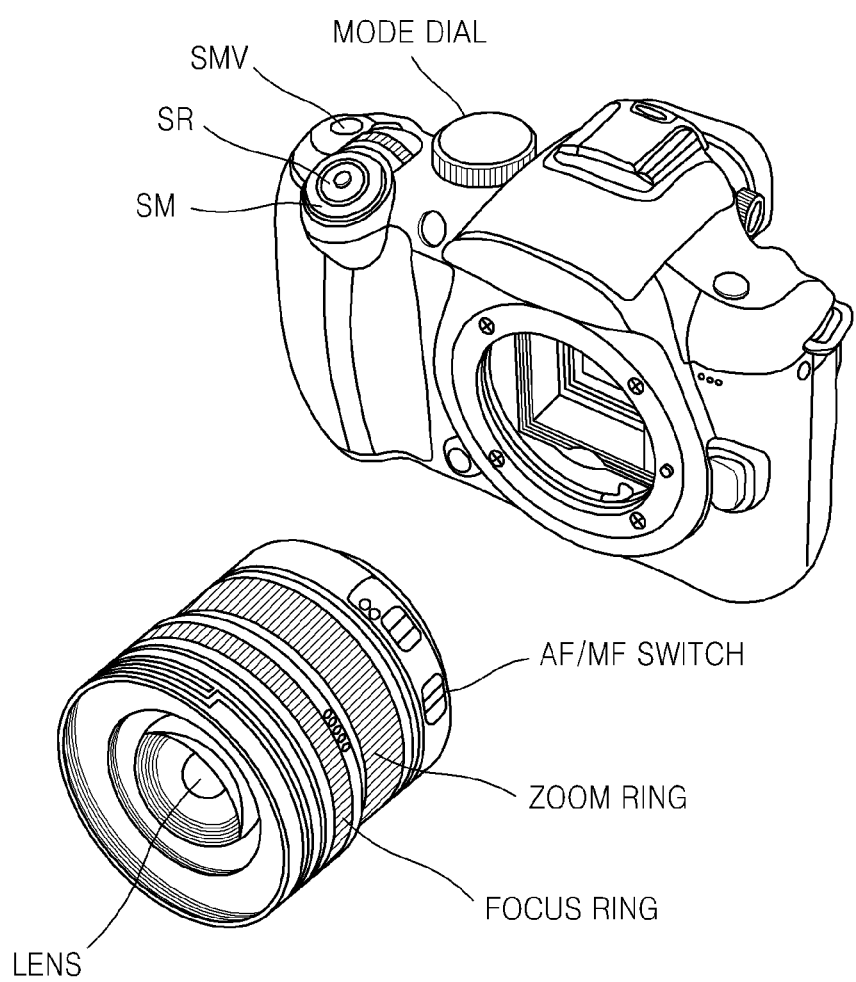
FIG. 1 is a perspective view of a front surface of a digital image processing apparatus, according to an embodiment.
Figure 2:
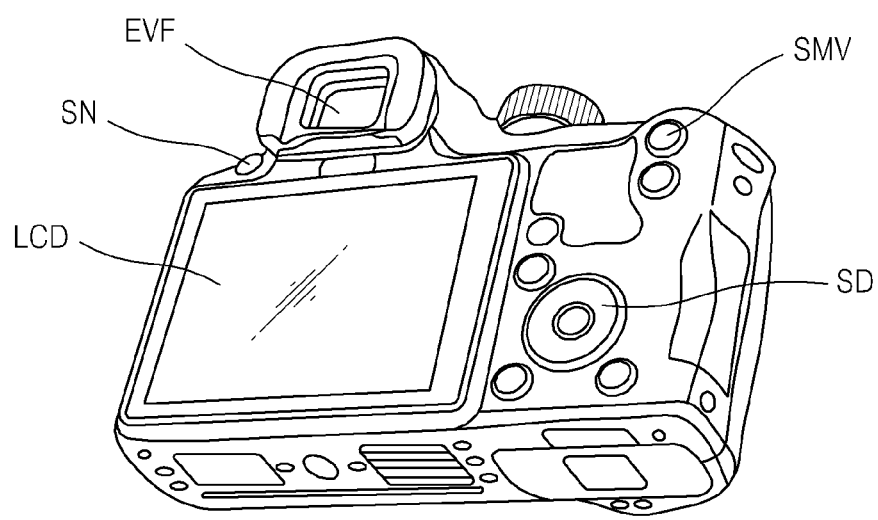
FIG. 2 is a perspective view of a rear surface of the digital image processing apparatus illustrated in FIG. 1.

FIG. 1 is a perspective view illustrating a front surface of a digital image processing apparatus, according to an embodiment. FIG. 2 is a perspective view illustrating a rear surface of the digital image processing apparatus illustrated in FIG. 1.

In the embodiment shown, the digital image processing apparatus is described with respect to an interchangeable lens digital camera. However, embodiments are not limited thereto. That is, the digital image processing apparatus may be any of various image processing apparatuses, such as a digital camera to which a lens is fixed, a camcorder, a mobile phone, a smart phone, a personal digital assistant (PDA), a TV, or the like.

Referring to FIG. 1, an interchangeable lens and a body of the interchangeable lens digital camera can be separated from each other.

The interchangeable lens can include a lens or lenses, a zoom ring that can be disposed around the lenses and that can change a focal distance of the lenses, a focus ring that can perform manual focusing, and a mode conversion switch that can perform auto focusing (AF) or manual focusing (MF).

A mode dial can generate a user input signal for changing a photographing mode, such as changing between still image capturing and video recording. The mode dial can be disposed on an upper surface of the body of the interchangeable lens digital camera. In addition, a shutter release button SR can generate different user input signals according to a pressing of the shutter release button SR, for example, a half-pressing or a full-pressing. The shutter release button SR can be disposed on the upper surface of the body of the interchangeable lens digital camera. AF may be performed in correspondence to a switch S1 ON state in which the shutter release button SR may be half-pressed. An image may be captured and recorded in correspondence to a switch S2 ON state in which the shutter release button SR may be full-pressed.

Referring to FIG. 2, an electronic viewfinder (EVF) and a display unit (liquid crystal display (LCD)) that can display a captured image or various information can be disposed on a rear surface of the body. In addition, a menu button SN that can select operations of the interchangeable lens digital camera can be disposed on the rear surface of the body of the interchangeable lens digital camera. In the embodiment shown, a direction button SD that can select candidate images may be disposed on the rear surface of the body of the interchangeable lens digital camera. A button SMV that can start video recording may further be disposed on the rear surface of the body of the interchangeable lens digital camera.

The interchangeable lens digital camera can start operating when a main switch SM is set to ON. In the current embodiment, the interchangeable lens digital camera can be operated by adjusting a rotation position of the main switch SM, but embodiments are not limited thereto. That is, the interchangeable lens digital camera may be turned on through various user manipulations, for example, pressing or touching of the main switch SM.

In the interchangeable lens digital camera, a live view image may be displayed on the EVF and/or the display unit. In the current embodiment, one or more candidate images corresponding to photographing setting information that can be obtained from the input live view image may be displayed on the EVF and/or the display unit. In addition, a user may select any one of the candidate images via the direction button SD, may set photographing setting information corresponding to the selected candidate image, and may capture an image according to a predetermined condition by full-pressing the shutter release button SR.

Figure 3:
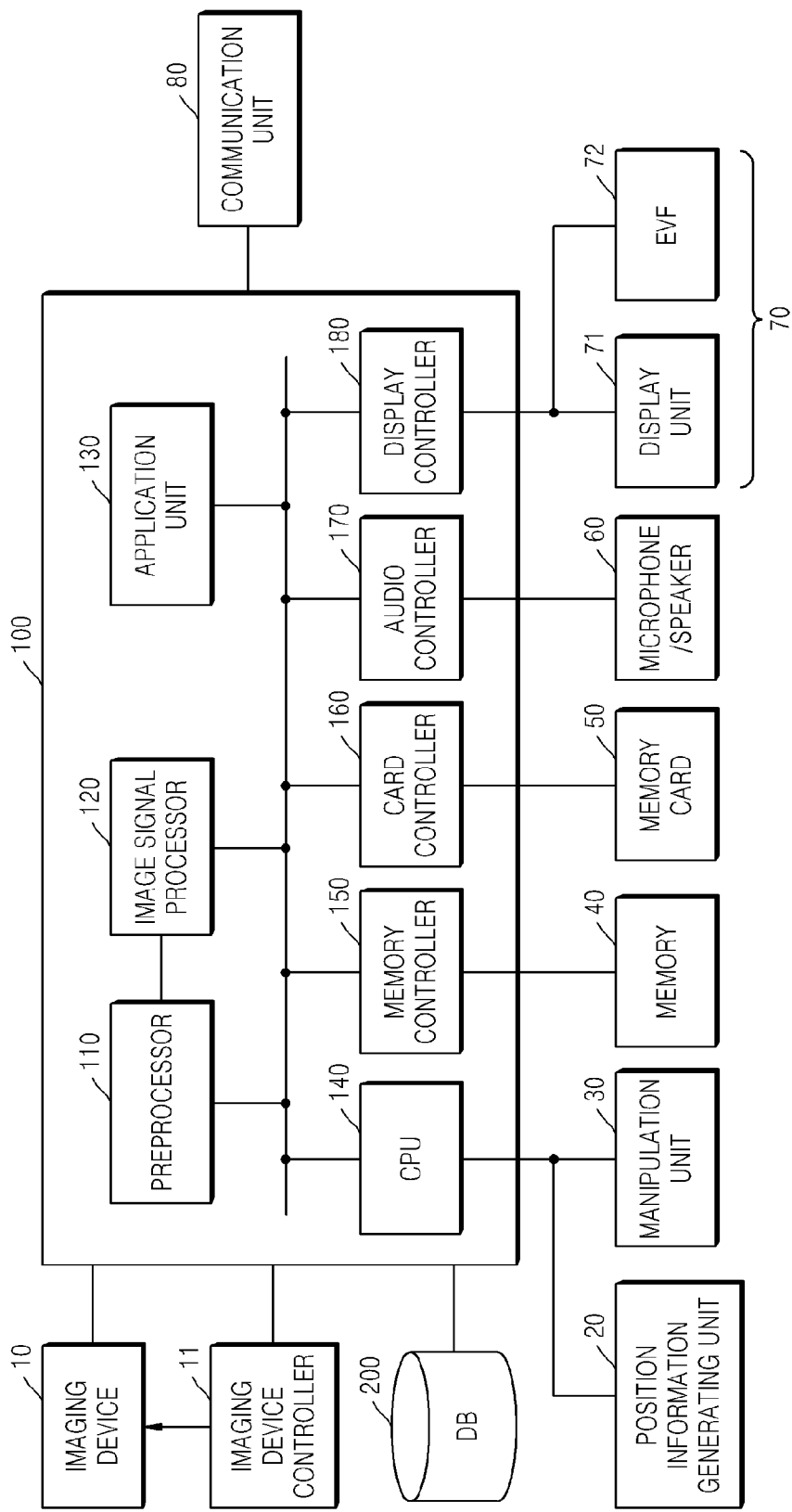
FIG. 3 is a block diagram of a body of the digital image processing apparatus illustrated in FIG. 1.

FIG. 3 is a block diagram of the body of the digital image processing apparatus illustrated in FIG. 1, according to an embodiment. Referring to FIG. 3, the body can include a imaging device 10 and a imaging device controller 11. The imaging device 10 can generate an image signal by capturing image light passed through an image forming optical system of the interchangeable lens. The imaging device 10 can include a plurality of photoelectric converters arranged in a matrix and a vertical and/or horizontal transmission path for generating the image signal by transferring charges from the plurality of photoelectric converters. The imaging device 10 may be a charge coupled device (CCD) sensor, a complementary metal oxide semiconductor (CMOS) sensor, or the like. The imaging device controller 11 may control the imaging device 10 to capture an image in response to a timing signal.

In addition, the body can include a controller 100. The controller 100 can include a preprocessor 110, an image signal processor 120, an application unit 130, a central processing unit (CPU) 140, a memory controller 150, a card controller 160, an audio controller 170, and a display controller 180.

The preprocessor 110 can calculate an auto white balance (AWB) evaluation value for performing white balance adjustment, an auto exposure (AE) evaluation value for performing exposure adjustment, and an auto focusing (AF) evaluation value for performing focusing, from the image signal obtained from the imaging device 10.

The image signal processor 120 can generate a preview image or a capture image by performing a series of image signal processings such as gamma correction.

The application unit 130 may perform scene recognition on the image signal, may perform face detection on the image signal, and may perform compression and expansion on the image signal on which one or more image signal processings have been performed. For example, the application unit 130 may compress the image signal into a compression format, for example, a joint photographic experts group (JPEG) compression format or an H.264 compression format. An image file including image data generated through the compression processing can be stored in a memory card 50.

The CPU 140 can entirely control operations of each element of the interchangeable lens digital camera according to user manipulation, stored programs, or the input image signal. The CPU 140 is described later in detail with reference to FIG. 4.

The memory controller 150 may temporarily store captured images, various information, etc., in a memory 40 or output the stored captured images and various information from the memory 40. The memory controller 150 may also read program information stored in the memory 40.

The card controller 160 may store or read the image file in or from the memory card 50. The card controller 160 may also control reading of various information stored in the memory card 50 and storing of various information to be stored in the memory card 50.

The audio controller 170 may control a microphone/speaker 60.

The display controller 180 may control image displaying performed by a display unit 71 and an electronic viewfinder (EVF) 72. In the current embodiment, the display controller 180 can control both the display unit 71 and the EVF 72, but embodiments are not limited thereto. That is, the display controller 180 may individually control the display unit 71 and the EVF 72. The display unit 71 or the EVF 72 may be configured as any of various display units such as an LCD or an organic light-emitting diode (OLED).

In addition, the body of the interchangeable lens digital camera may include a manipulation unit 30 that can input user manipulation signals. The manipulation unit 30 may include the shutter release button SR, the main switch SM, the mode dial, the menu button SN, and the like. Members such as switches, buttons, and dials are described as being included in the manipulation unit 30 for the embodiment shown, but embodiments are not limited thereto. That is, a touch panel or touch unit that can be installed inside or outside of the display unit 71 may be disposed, and the touch panel or the touch unit may be a part of the manipulation unit 30.

Also, in the current embodiment, the body of the interchangeable lens digital camera may further include a position information generating unit 20. The position information generating unit 20 may be a global positioning system (GPS) receiving apparatus, and the GPS receiving apparatus may receive position information from a GPS satellite.

In addition, the body of the interchangeable lens digital camera may further include a database (DB) 200 capable of obtaining sensibility-based images. Alternatively, the database 200 may be stored in a server, and the interchangeable lens digital camera may access the server and use the database 200 stored in the server via a communication unit 80.

Figure 4:
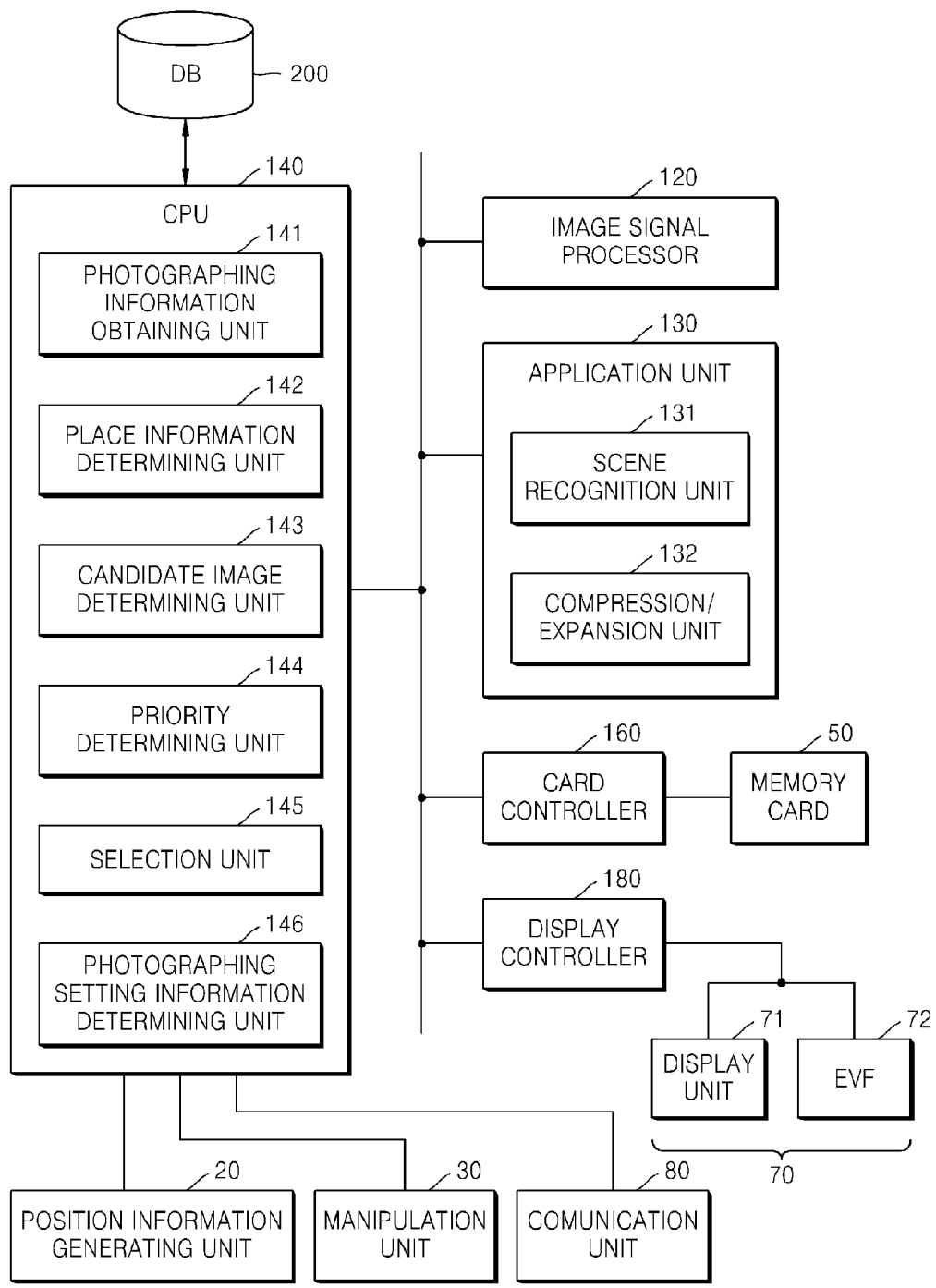
FIG. 4 is a block diagram for explaining the body illustrated in FIG. 3 in more detail.

FIG. 4 is a block diagram of the body of the digital image processing apparatus illustrated in FIG. 3 in more detail.

Referring to FIG. 4, the database 200 may include a first database that can store candidate images according to photographing setting information corresponding to a plurality of image effects and a second database that can store photographing setting information according to the candidate images. The database 200 itself may be stored in the interchangeable lens digital camera, or may be stored in the server so that the interchangeable lens digital camera may access the server via the communication unit 80 and use information from the first and second databases by downloading the first and second databases from the server.

FIG. 5 is a table for explaining the first database. Referring to FIG. 5, user desired sensibility-based images can be grouped, and a plurality of pieces of photographing setting information corresponding to respective candidate images of each group can be stored in a database. For example, the candidate images can be grouped according to camera techniques such as out focus, pan focus, capturing moment, trace expression, and silhouette. Four candidate images showing the out focus effect are illustrated in FIG. 5. Photographing setting information corresponding to each candidate image can be stored. The photographing setting information can be objective data that may be obtained from the candidate images. The photographing setting information may include subject information, color information, face information, exposure information, and the like. In particular, the subject information may include a type, a position, and a motion of a subject, etc.; the color information may include a temperature, a hue, and a saturation of a color, etc.; and the face information may include a number of detected faces, a size of a face area, and a position of a face area, etc. The photographing setting information may also include position information, scene information, etc. In the embodiment shown, the photographing setting information may include various information that may be directly determined from image data for forming an input image, instead of information determined from metadata stored in exchangeable image file format (Exif) of an image file. In detail, the photographing setting information may include various information determined from the image data through a predetermined algorithm, for example, a 3A algorithm, a subject recognition algorithm, a face recognition algorithm, or a histogram.

FIG. 6 is a table for explaining the second database. Referring to FIG. 6, the second database can store a plurality of pieces of photographing setting information for obtaining candidate images included in each sensibility effect group. For example, the second database can store the plurality of pieces of photographing setting information corresponding to candidate images NO1 and NO2 obtained from the first database and included in each sensibility effect group. The photographing setting information may include an aperture value FN, a sensitivity ISO, a shutter speed, flash information, photometric information, and the like.

Referring back to FIG. 4, the CPU 140 may include a photographing setting information obtaining unit 141 that can obtain photographing setting information from an input image, a candidate image determining unit 143 that can determine one or more candidate images having photographing setting information similar to the obtained photographing setting information from the first database, and a photographing setting information determining unit 146 that can determine photographing setting information corresponding to a selected candidate image from the second database.

The input image may be generated in the image signal processor 120. The input image, which is inputted before an image capture signal, may be inputted in real time to be displayed on the display unit 71 or the EVF 72. The input image inputted in real time to be displayed on the display unit 71 or the EVF 72 may be a live view image. Photographing setting information may be obtained from image data constituting the input image.

The candidate image determining unit 143 may determine the candidate images having photographing setting information similar to the obtained photographing setting information from the first database. The candidate image determining unit 143 may determine one or more candidate images corresponding to photographing setting information that is the same as the obtained photographing setting information or has a degree of similarity with respect to the obtained photographing setting information greater than a predetermined standard value. The determined one or more candidate images may be displayed on the display unit 71 or the EVF 72.

The photographing setting information determining unit 146 can determine the photographing setting information corresponding to the selected candidate image.

The image signal processor 120 may generate a capture image by applying the determined photographing setting information and with full-pressing of the shutter release button SR. The capture image may be compressed in a compression/expansion unit 132 of the application unit 130 and then stored in an image file. The image file may be stored in the memory card 50.

Meanwhile, the capture image generated by applying the determined photographing setting information may be displayed on the display unit 71 or the EVF 72 by using a quick-view function. Alternatively, the capture image may be obtained by decoding the image file in the compression/expansion unit 132 and may be reproduced in the display unit 71 or the EVF 72.

In addition, a preview image can be generated in the image signal processor 120 by applying the photographing setting information determined before capturing an image to the input image, and the preview image may be displayed on the display unit 71 or the EVF 72. In this regard, the preview image, which is generated by applying the determined photographing setting information to the input image, may be an image to be shown to the user prior to capturing an image. When the preview image is displayed in real time by applying the determined photographing setting information to the input image inputted in real time, the preview image may be a live view image.

Also, the CPU 140 may further include a place information determining unit 142. Place information may be determined according to the position information generated in the position information generating unit 20. The position information generating unit 20 may be a GPS receiving apparatus. For example, the GPS receiving apparatus can receive present position information from a GPS satellite. Present place information corresponding to the present position information may be determined from a database of place information determined according to the position information. The database of place information determined according to the position information may be stored in the DB 200 in the interchangeable lens digital camera or the server. If the database is stored in the server, necessary information may be determined from the database when the interchangeable lens digital camera accesses the server via the communication unit 80 of the interchangeable lens digital camera.

The candidate image determining unit 143 may determine candidate images corresponding to the determined place information. At this time, a third database of the candidate images determined according to the determined place information can be additionally disposed, and thus the candidate images may be determined from the third database. Alternatively, the above-described first database may store not only the photographing setting information but also the candidate images determined according to the place information. Thus, the candidate image determining unit 143 may determine the photographing setting information and the candidate images determined according to the place information.

The photographing setting information may be photographing composition information. The photographing setting information determining unit 146 may determine the photographing composition information as the photographing setting information corresponding to the selected candidate image from the second database storing the photographing setting information determined according to the selected candidate image. The determined photographing composition information may be displayed on the display unit 71 or the EVF 72. The determined photographing composition information may be displayed together with at least a subject image in the live view images on the display unit 71 or the EVF 72.

In addition, in the current embodiment, the CPU 140 may further include a priority determining unit 144. The priority determining unit 144 may determine priorities of the candidate images determined according to the degree of similarity to the input image.

The interchangeable lens digital camera may further include a selection unit 145 that can select the candidate images. The selection unit 145 may automatically select one of the candidate images according to the above-described priorities. The photographing setting information determining unit 146 may determine photographing setting information corresponding to the selected candidate image. In addition, the user may manipulate the direction button SD of the manipulation unit 30 and may select one of the candidate images in the selection unit 145 in correspondence to the manipulation. The priorities may be displayed on the display unit 71 or the EVF 72. The candidate images may also be displayed on the display unit 71 or the EVF 72 according to the priorities. The user may check the displayed priorities and may generate a manipulation signal for selecting any one of the candidate images according to the priorities.

The interchangeable lens digital camera may further include a scene recognition unit 131. The scene recognition unit 131 may be included in the application unit 130. The scene recognition unit 131 may recognize a predetermined scene with respect to the input image. For example, the scene recognition unit 131 may recognize a night scene when many dark colors are included in the input image, may recognize a person image if a face area is detected, and may recognize a white scene, such as a scene in which snow is photographed, when many pieces of white color information are included in the input image by using color information of the live view image. The scene recognition unit 131 may determine a specific scene by using other image pattern information. One or more candidate images corresponding to the recognized scene with respect to the input image may be determined from the first database storing the candidate images according to the scene information.

Figure 7:
FIGS. 7 through 9 illustrate sensibility-based images, according to an embodiment.
Figure 8:
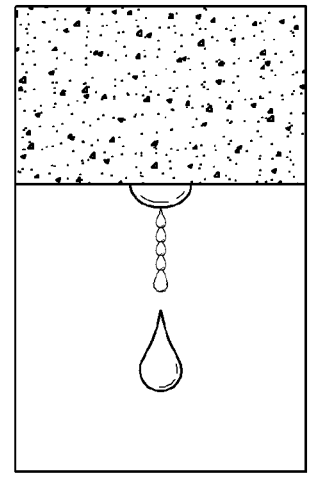
Figure 9:

FIGS. 7 through 9 illustrate sensibility-based images, according to an embodiment. Sensibility can be a property corresponding to stimulation or a change in stimulation and can be a concept opposite to rationality. Sensibility can correspond to a human's cognitive ability for forming a symbol by sensing and perceiving an outer object through five sensory organs. Images having sensibility may include an out focusing image in which only a dog, that is, a main subject, can be in focus and a background can be vague as illustrated in FIG. 7, a moment capturing image in which water drops fall as illustrated in FIG. 8, an image depicting a silhouette by using backlight as illustrated in FIG. 9, and the like. When various functions of a camera, such as automatic exposure, automatic focusing, automatic white balance adjusting, etc., are used, a subject may always be photographed distinctly and clearly, and thus sensibility-based images may be obtained. In addition, if a photographer is not a professional, the photographer may not obtain the sensibility-based images by manipulating the camera manually. However, according to the embodiments, images having various sensibilities may be easily obtained.

Hereinafter, a digital image processing method and a digital image processing is described with reference to the accompanying drawings.

Figure 10:
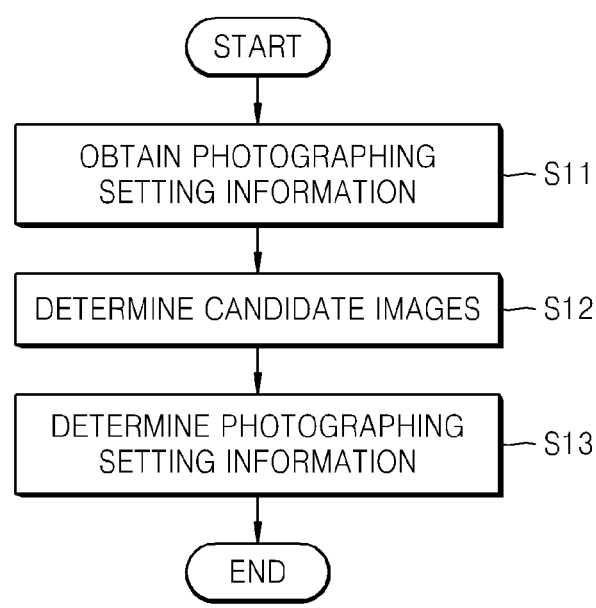
FIG. 10 is a flowchart for explaining a digital image processing method, according to an embodiment.

FIG. 10 is a flowchart of a digital image processing method, according to an embodiment. Referring to FIG. 10, photographing setting information can be obtained with respect to an input image (S11). One or more candidate images corresponding to the obtained photographing setting information can be determined (S12). The one or more candidate images may be determined from the first database of candidate images according to the obtained photographing setting information as described above. Photographing setting information corresponding to a selected candidate images can be determined from the second database of photographing setting information according to the selected candidate image (S13), and the determined photographing setting information may be set.

Figure 11:
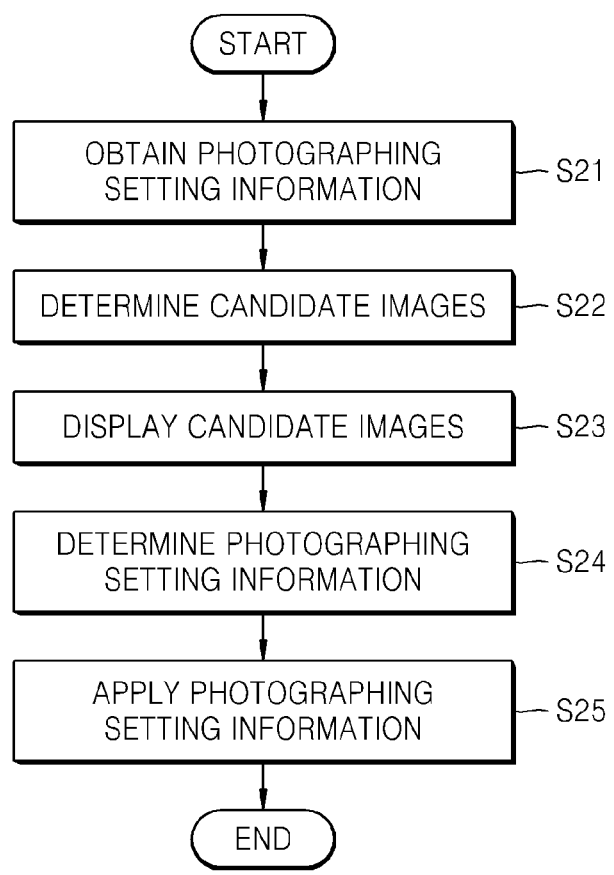
FIG. 11 is a flowchart for explaining a digital image processing method, according to another embodiment.
Figure 12:
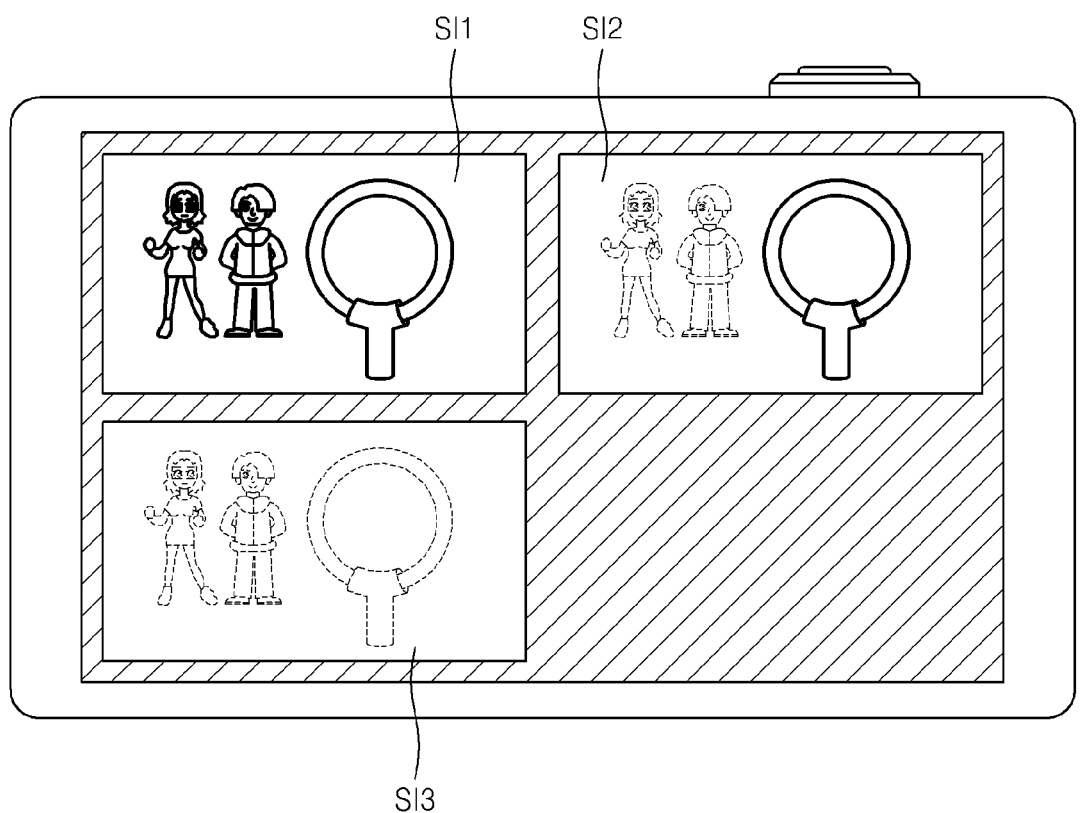
FIG. 12 illustrates candidate images being displayed, according to an embodiment.

FIG. 11 is a flowchart of a digital image processing method, according to another embodiment. Referring to FIG. 11, photographing setting information can be obtained with respect to an input image (S21). As described above, one or more candidate images corresponding to the obtained photographing setting information are determined (S22). The one or more candidate images may be determined from the first database of the candidate images according to the obtained photographing setting information. The determined one or more candidate images can be displayed (S23). FIG. 12 illustrates candidate images SI1, SI2, and SI3 being displayed. For example, when information in which a main subject is positioned in a center area is included as the photographing setting information, the candidate images SI1, SI2, and SI3 corresponding to the photographing setting information can be displayed. SI1 is a candidate image of pan focus, SI2 is a candidate image of out focus in which a focus is adjusted on a main focus, and SI3 is a candidate image that is out of focus. Then, any one of the displayed one or more candidate images can be selected, and photographing setting information corresponding to the selected candidate image can be determined (S24). In FIG. 12, when the candidate image SI2 is selected, photographing setting information having an aperture value of 2.0, a sensitivity of 100, and a shutter speed of 1/2500 may be determined. Selection of a candidate image may be automatically performed in the interchangeable lens digital camera. For example, the selection of the candidate image may be automatically performed according to priorities of the one or more candidate images. Alternatively, a user may select one candidate image by using the manipulation unit 30, for example, the direction button SD. The photographing setting information may be determined from the above-described second database, in correspondence to the selected candidate image. The determined photographing setting information can then be set (S25).

Afterwards, the photographing setting information can be applied to a live view image that is inputted in real time so as to generate a preview image. The user may determine whether to apply the photographing setting information to the live view image when capturing an image by checking the preview image to which the photographing setting information is applied and a preview image to which the photographing setting information is not applied.

In addition, a capture image to which the photographing setting information is applied may be generated, can be stored in an image file, and can be recorded in a recording medium.

Figure 13:
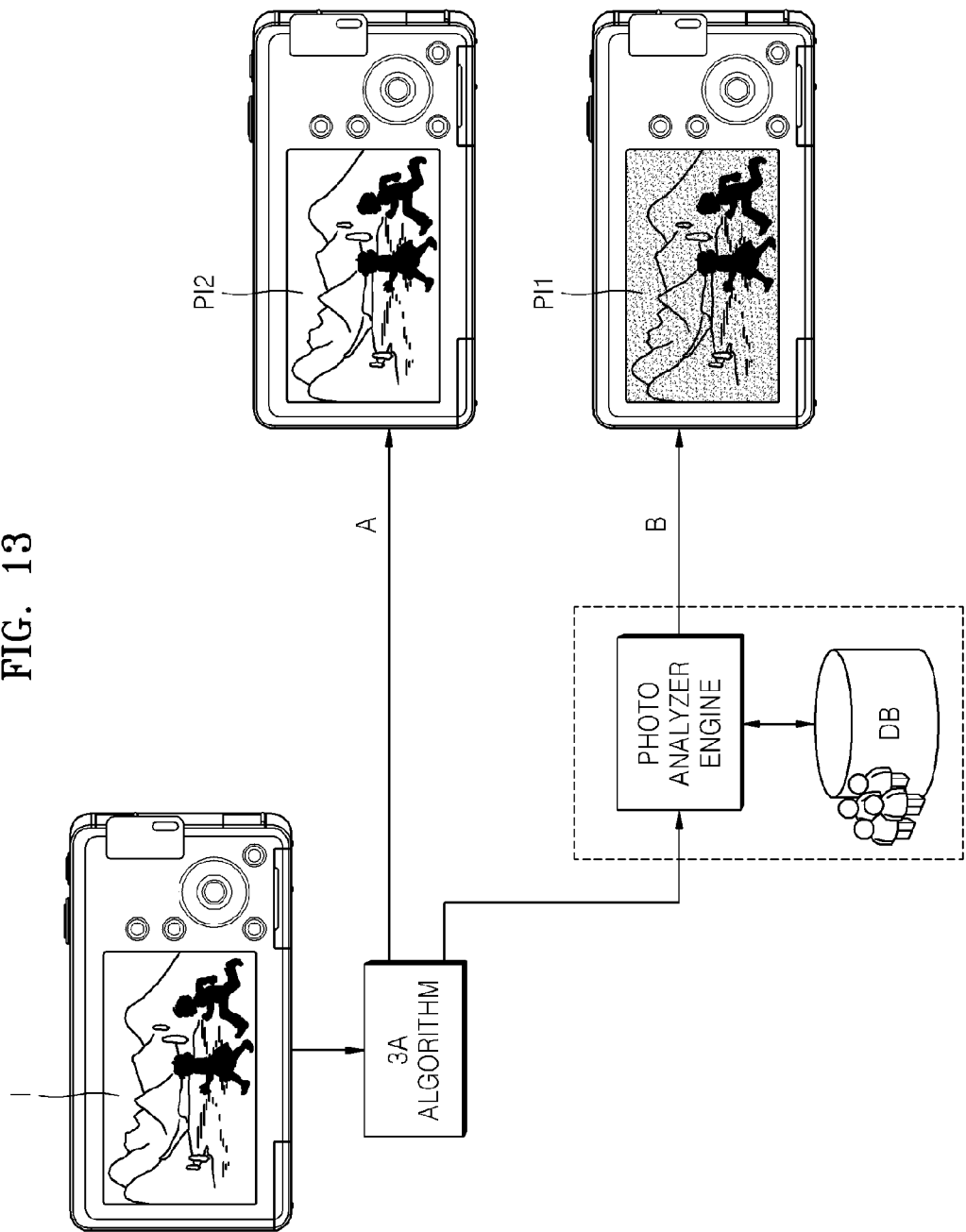
FIG. 13 is a diagram for explaining a process for applying photographing setting information and a process for applying photographing setting information to an input image, according to an embodiment.

FIG. 13 is a diagram for explaining a process for applying photographing setting information and a process for applying the photographing setting information to an input image.

First, a database including images previously captured by many people can be constructed. The database may include the first database of candidate images corresponding to photographing setting information and the second database of photographing setting information corresponding to the candidate images. The photographing setting information may include brightness information, color information, focus information, character information, scene information with regard to a background or a subject, and the like. The photographing setting information may include a shutter speed, exposure, sensitivity, an aperture value, and the like. The images captured by many people may be candidate images, wherein the candidate images are classified according to the photographing setting information, and the photographing setting information corresponding to the candidate images is stored. In the embodiment shown, the database can be divided into the first database and the second database for convenience. However, the database may be configured as one database.

Referring to FIG. 13, photographing setting information, such as brightness information, color and temperature information, or focus information, may be obtained with respect to an input image through a 3A algorithm. In addition, photographing setting information, such as character information obtained through a face detection (FD) algorithm or scene information regarding a background or a subject, may be obtained from a photo analyzer engine. Candidate images corresponding to the photographing setting information can be determined from a database DB. When one or more candidate images having photographing setting information similar to the photographing setting information of the input image are obtained, priorities of the candidate images may be determined according to similarity. The priorities may be provided to the user afterwards so as to help the user to select one of the candidate images, or the interchangeable lens digital camera may automatically select any one candidate image according to the priorities. Photographing setting information B corresponding to the selected candidate image can be obtained from the database DB. The obtained photographing setting information B can be applied to the input image, and thus a first preview image PI1 can be generated and displayed.

In the embodiment shown, photographing setting information need not be determined by using the selected candidate image. That is, photographing setting information A as a comparative example of the photographing setting information B may be determined and applied in correspondence to the photographing setting information obtained through the 3A algorithm. Thus, a second preview image PI2 may be generated and displayed.

Figure 14:
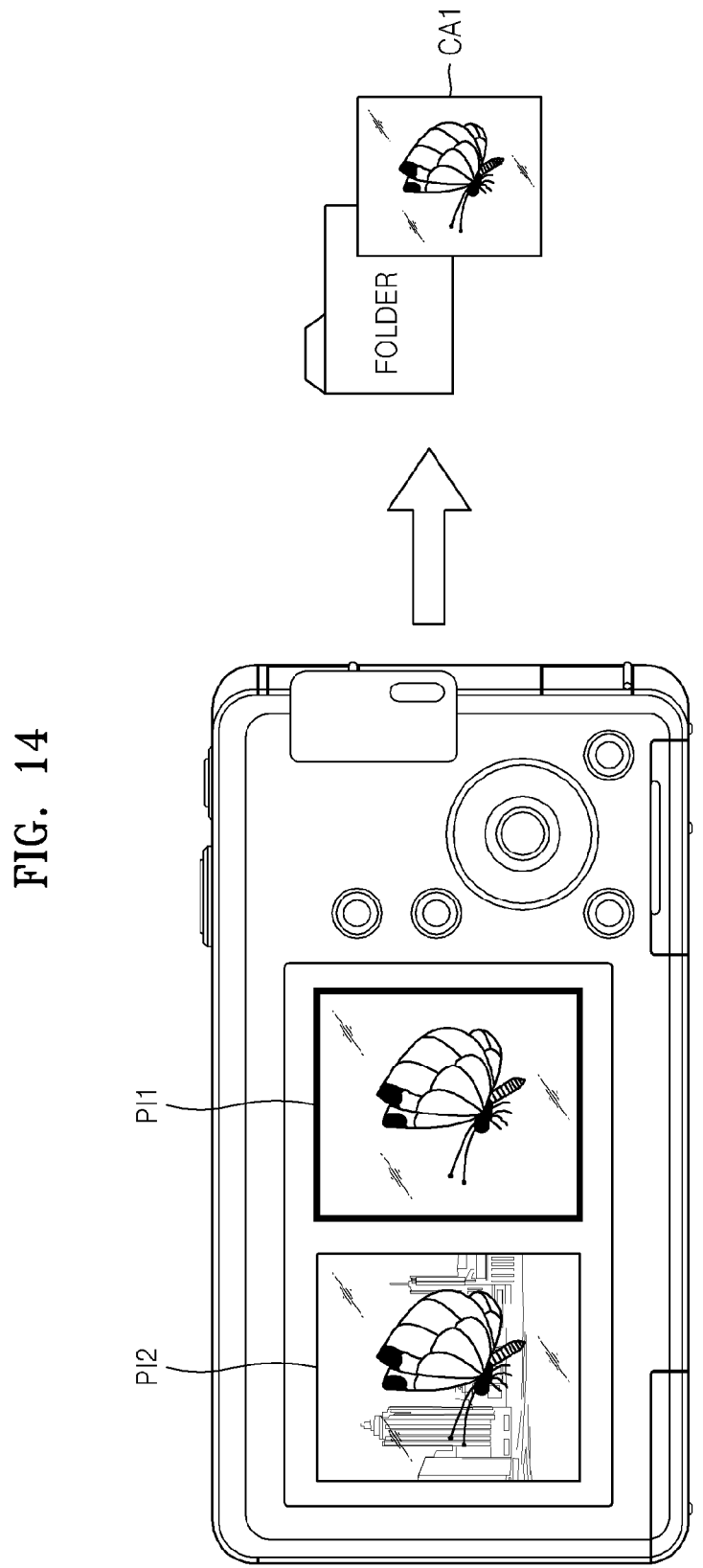
FIGS. 14 through 16 are diagrams for explaining a process for displaying preview images respectively outputted in the processes illustrated in FIG. 13 and for storing a capture image, according to an embodiment.

FIG. 14 is a diagram for explaining a process for storing a capture image in an image file. In FIG. 14, a user can check the first preview image PI1 having sensibility, like an image captured by a professional, and the second preview image PI2 obtained by automatic photographing of the interchangeable lens digital camera. If the user selects the first preview image PI1, the user can capture a first capture image CA1 by applying the photographing setting information B corresponding to the first preview image PI1 and can store the first capture image CA1 in the image file.

Figure 15:
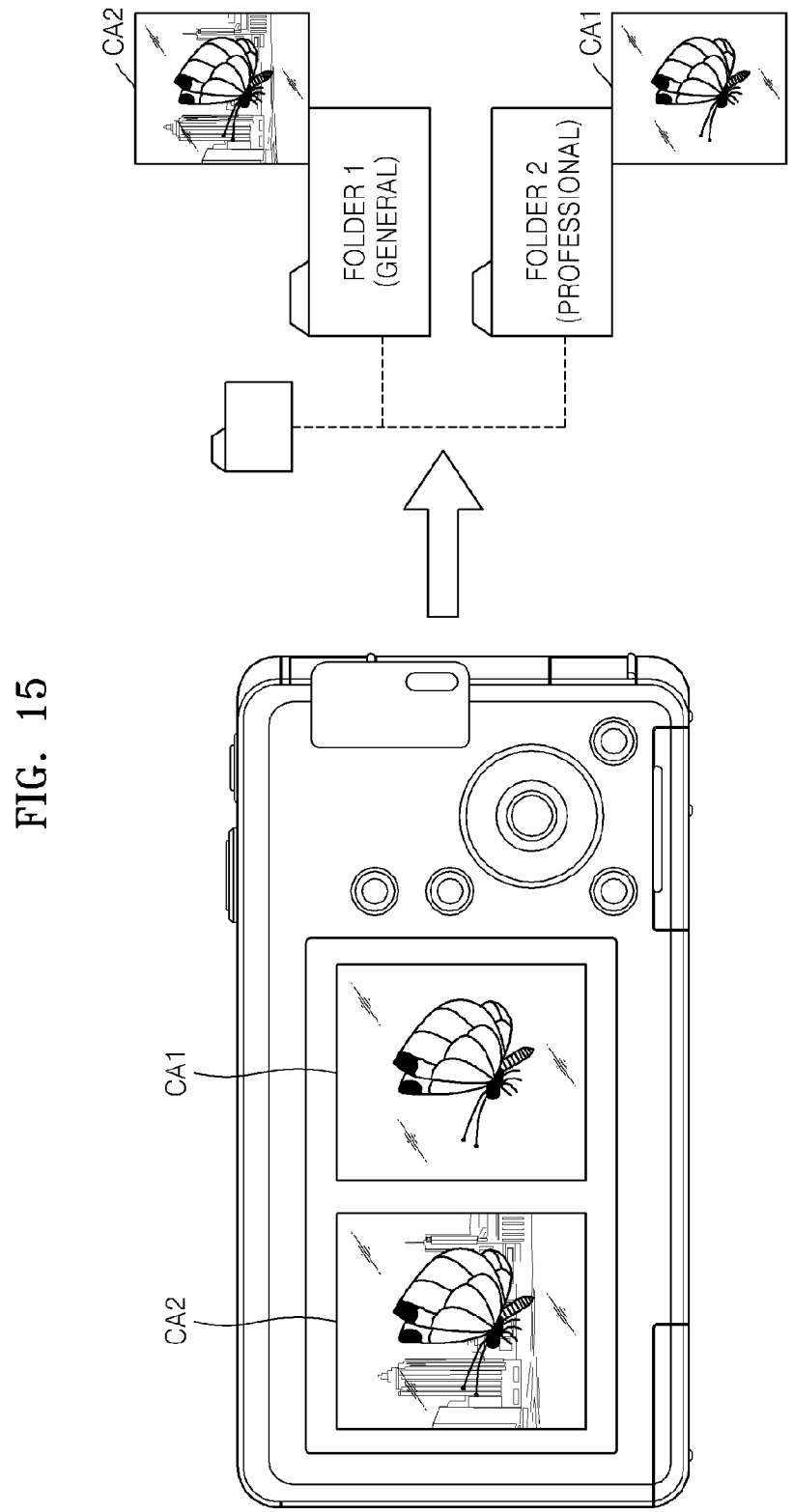

FIG. 15 is a diagram for explaining a process for storing the first capture image CA1 and a second capture image CA2 captured by applying photographing setting information obtained from the database DB in respective folders. The first capture image CA1 can be a shot having sensibility and can be made using an exposure value and a white balance value obtained by searching for a scene most similar to an input image from the database, and the second capture image CA2 can be a general shot made by controlling an exposure value, a white balance value, etc., calculated in the interchangeable lens digital camera. In the current embodiment, the first capture image CA1 and the second capture image CA2 can be simultaneously generated and can be stored in respective folders. In this regard, the simultaneous generating of the first capture image CA1 and the second capture image CA2 may mean that the first capture image CA1 may be generated by applying the photographing setting information obtained from the database to an input image generated through one photographing operation and the second capture image CA2 may be generated by automatic control of the interchangeable lens digital camera with respect to the input image. Alternatively, the first capture image CA1 may be generated by applying the photographing setting information obtained from the database to any one of a plurality of input images inputted through continuous photographing operations, and the second capture image CA2 may be generated by automatic control of the interchangeable lens digital camera with respect to another input image. For example, except for a change in exposure and focusing, white balance, color adjustment such as black/white or sepia, and sharpness or soft treatments as the photographing setting information may be changed in the following process. Thus, the first capture image CA1 and the second capture image CA2 may be generated with respect to the same input image. The change in exposure and focusing should be reflected during photographing, and thus the first capture image CA1 and the second capture image CA2 may be generated with respect to a plurality of input images obtained through continuous photographing operations to be described later.

Figure 16:
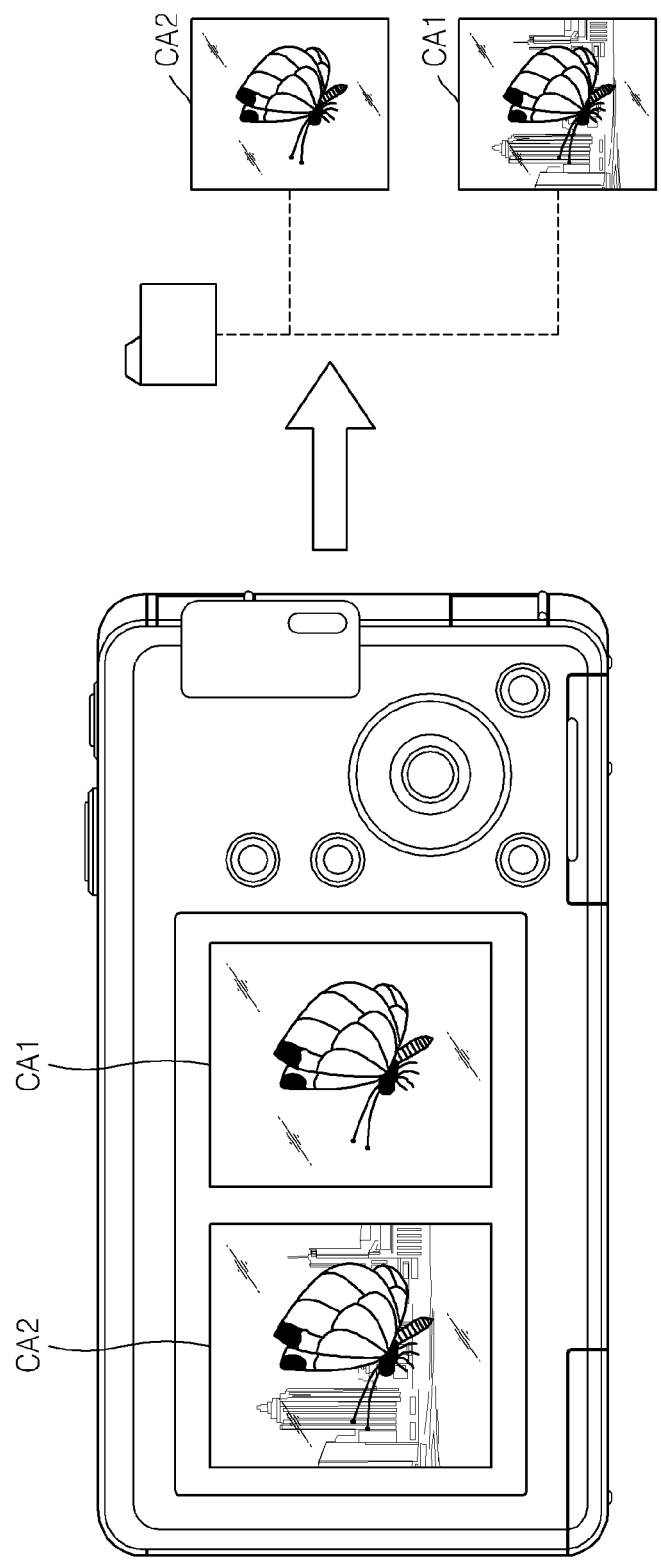

FIG. 16 illustrates the first capture image CA1 and the second capture image CA2 stored in a single folder.

Figure 17:
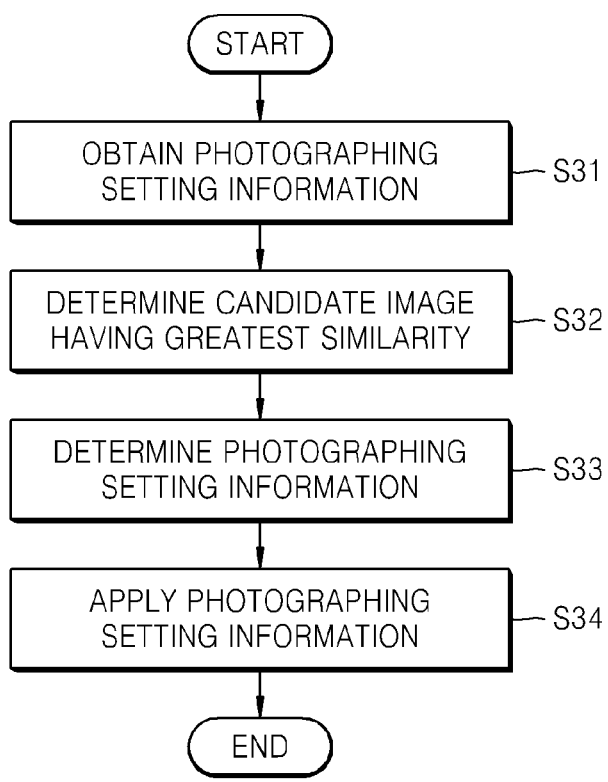
FIG. 17 is a flowchart of a digital image processing method, according to another embodiment.

FIG. 17 is a flowchart of a digital image processing method, according to another embodiment. Referring to FIG. 17, photographing setting information can be obtained (S31). A candidate image that has photographing setting information that is the most similar to the photographing setting information can be determined from the first database (S32). Photographing setting information corresponding to the candidate image can be determined (S33). The determined photographing setting information can be applied (S34).

Figure 18:
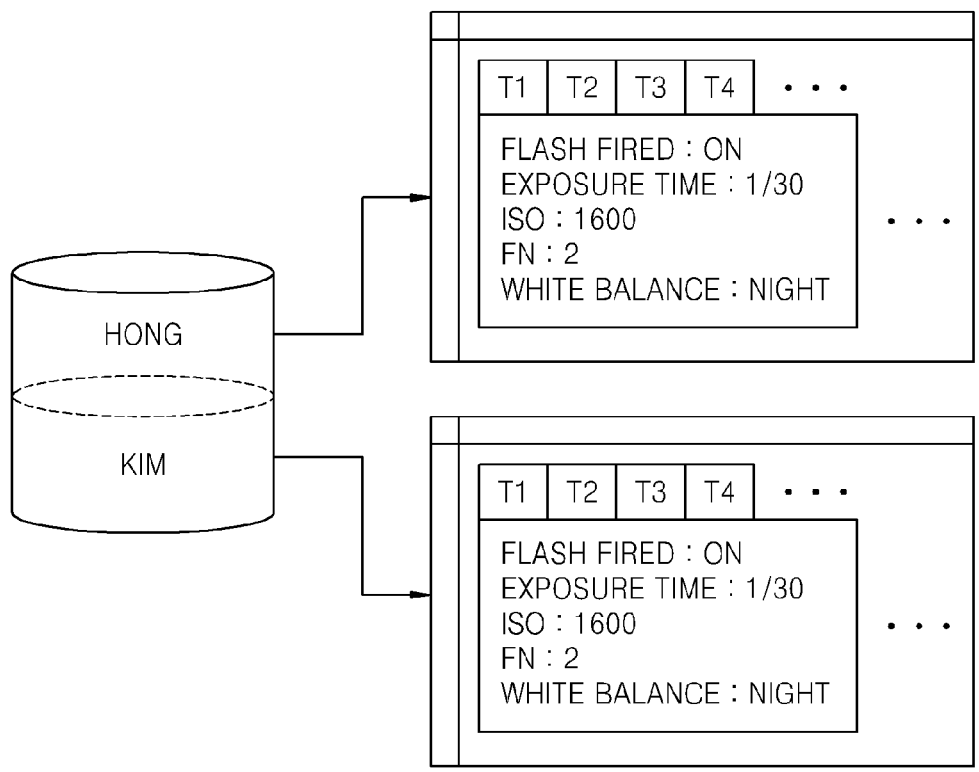
FIG. 18 is a diagram of a database storing candidate images according to photographer information, according to an embodiment.

FIG. 18 is a diagram for explaining a database storing candidate images according to photographer information, according to an embodiment. Referring to FIG. 18, a third database of candidate images determined according to photographer information can be generated by classifying candidate images of many photographers. Candidate images T1 through T4 corresponding to a photographer 'Hong' can be stored in the third database. In the current embodiment, photographing setting information corresponding to each candidate image can also be stored in the third database. Accordingly, the second database storing the photographing setting information according to the candidate images can be included.

Figure 19:
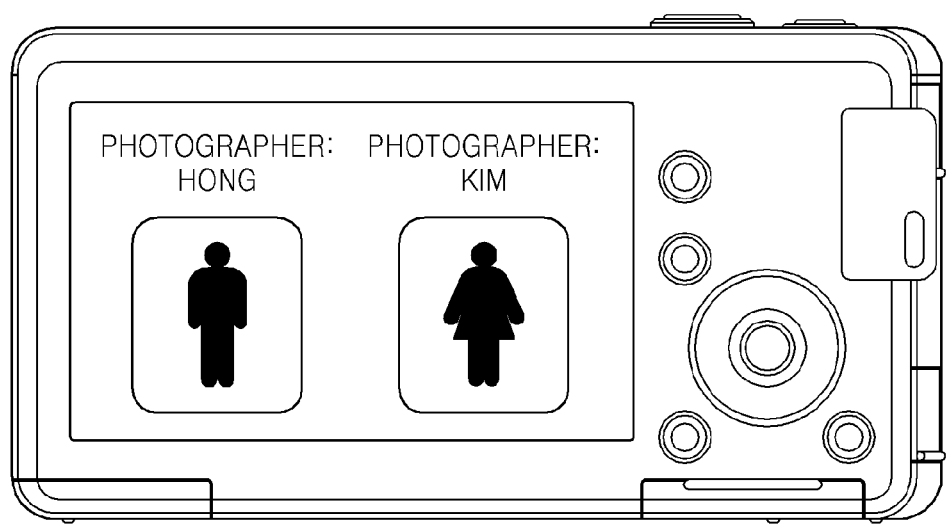
FIG. 19 is a view for explaining a candidate image displayed together with photographer information derived from the database of FIG. 18.

Hereinafter, a method of utilizing the third database is described. The candidate images can be determined from the first database in correspondence to photographing setting information obtained from an input image. Then, the photographer information can be obtained from the third database in correspondence to the determined candidate images, and the obtained photographer information can be provided to a user. For example, as illustrated in FIG. 19, the candidate images can be displayed according to a photographer. The user can check the photographer or the candidate images. If the user selects any one of the candidate images, the photographing setting information corresponding to the selected candidate image may be obtained from the third database and applied.

FIGS. 20 through 25 are views for explaining a digital image processing method, according to another embodiment. In the current embodiment, a database can be constructed or updated through a website; necessary information can be obtained from the database; and the information can be applied.

Figure 20:
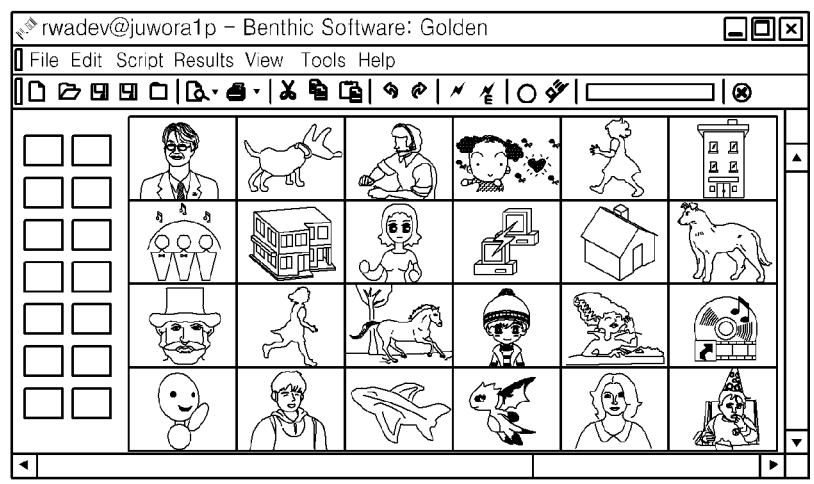
FIGS. 20 through 25 are views for explaining a digital image processing method, according to another embodiment.

Referring to FIG. 20, a user can access a website server storing captured images, can search for similar candidate images while focusing on a matter and a place of concern, and can download the candidate images into his or her memory card.

Figure 21:
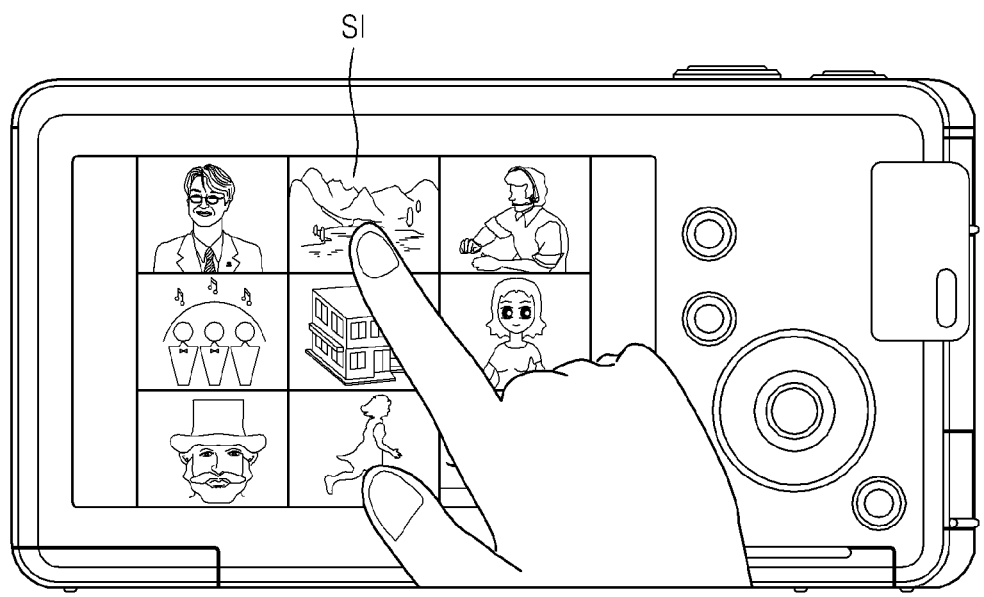

Referring to FIG. 21, the user can determine a subject to be photographed, and can select a candidate image SI having sensibility similar to sensibility that the user desires to obtain when photographing the subject. In the embodiment shown, the candidate image SI representing an atmosphere of a sunset can be selected.

Figure 22:
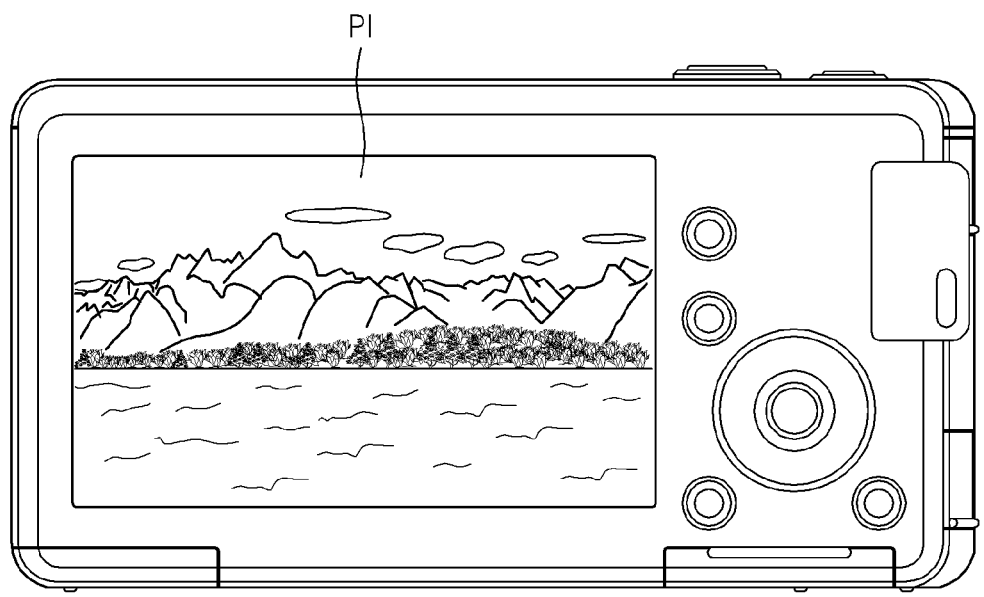

Referring to FIG. 22, photographing setting information corresponding to the selected candidate image PI can be obtained from the second database, and a preview image can be generated by applying the photographing setting information to a live view image that is inputted in real time. Then, the preview image can be displayed. At this time, because an image may be ruined due to the application of the photographing setting information to the live view image, a warning message may be sent to the user. For example, brightness information can be obtained from the preview image, and thus if the image is too dark or bright, a warning message "too dark or bright image cannot be obtained" may be outputted.

Figure 23:
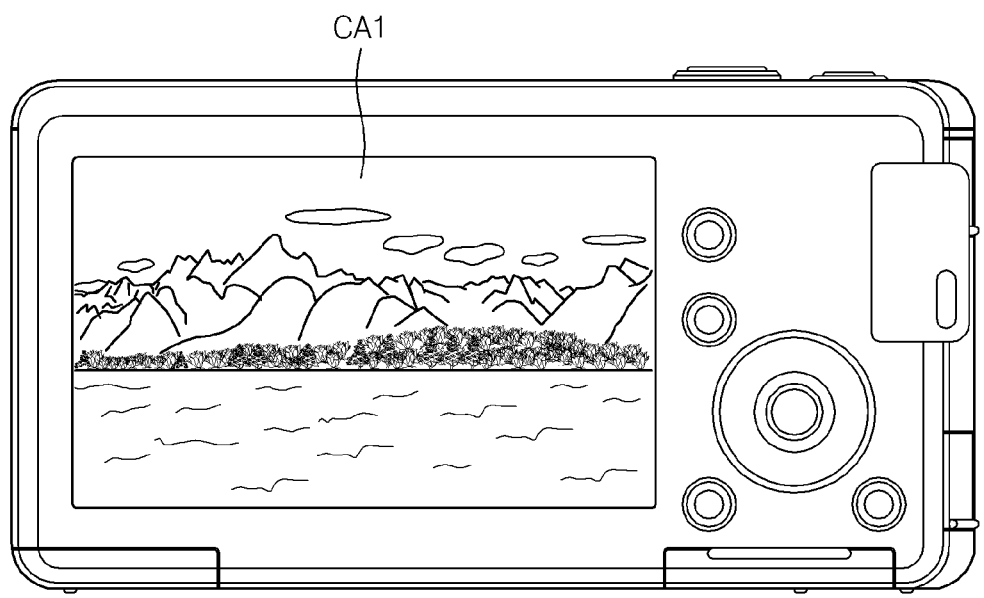

Referring to FIG. 23, when the application of the photographing setting information to the live view image is within a correctable range, a capture image can be generated. For example, a capture image CA1 can be generated according to the photographing setting information applied by full-pressing the shutter release button SR.

Figure 24:
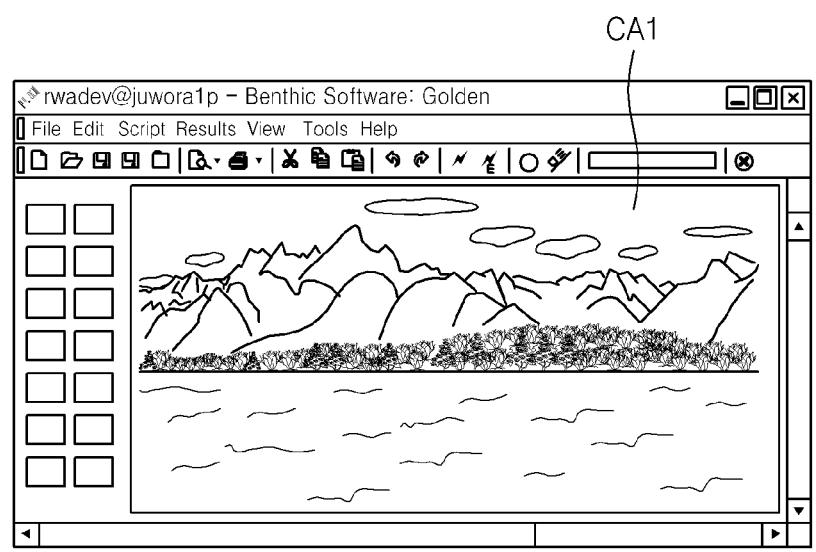

Referring to FIG. 24, when the capture image CA1 is shared, the capture image CA1, the photographing setting information corresponding to the selected candidate image PI, and the photographing setting information of the capture image CA1 may be uploaded to the website.

Figure 25:
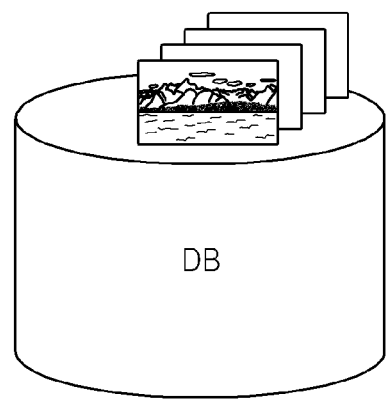

Referring to FIG. 25, the capture image CA1, the photographing setting information corresponding to the selected candidate image PI, and the photographing setting information of the capture image CA1 may be uploaded to the first database and the second database.

Figure 26:
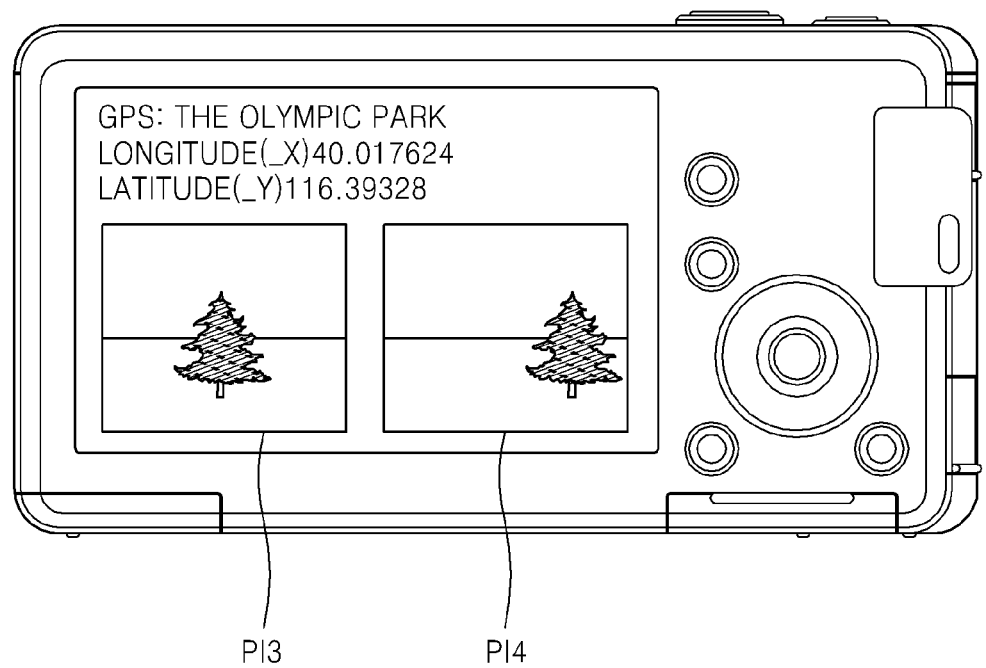
FIG. 26 is a view illustrating a candidate image displayed according to place information, according to an embodiment.

FIG. 26 is a view illustrating candidate images displayed according to place information, according to an embodiment.

First, a fourth database of candidate images including respective pieces of composition information corresponding to the place information may have been previously included. The fourth database can include the first database, and thus the fourth database may store the candidate images, including the respective plurality of pieces of composition information corresponding to the place information, together with the photographing setting information corresponding to each candidate image.

Present position information may be generated from the position information generating unit 20, which may be a GPS receiving apparatus, of the interchangeable lens digital camera. The place information corresponding to the position information may be determined, and the candidate images having the respective plurality of pieces of composition information corresponding to the place information may be obtained. The obtained candidate images may then be displayed. Photographer information may also be displayed. For example, the candidate images having different composition information corresponding to a photographer may be displayed. Referring to FIG. 26, candidate images PI3 and PI4 having respective plurality of pieces of composition information and photographed in Olympic Park are displayed. A user can select any one of the candidate images having different compositions, and composition information corresponding to the selected candidate image may be provided to the user. For example, the composition information may be illustrated as a dotted line on a live image.

According to various embodiments, the candidate images corresponding to the photographing setting information of the input image can be obtained from the first database, and the photographing setting information corresponding to the selected candidate image can be obtained from the second database. Thus, the user may easily obtain artistic and emotional images.

The above-described digital image processing method can also be embodied as computer readable code on a computer readable recording medium. The computer readable recording medium is any data storage device that can store data which can be thereafter read by a computer system. Examples of the computer readable recording medium include flash memory, and the like.

The device described herein may comprise a processor, a memory for storing program data to be executed by the processor, a permanent storage such as a disk drive, a communications port for handling communications with external devices, and user interface devices, including a touch panel, keys, buttons, etc.

When software modules or algorithms are involved, these software modules may be stored as program instructions or computer readable codes executable by the processor on a non-transitory computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. Also, using the disclosure herein, programmers of ordinary skill in the art to which the invention pertains can easily implement functional programs, codes, and code segments for making and using the invention. Furthermore, the invention may employ any number of conventional techniques for electronics configuration, signal processing and/or control, data processing and the like.

The words "mechanism", "element", "means", and "configuration" are used broadly and are not limited to mechanical or physical embodiments, but can include software routines in conjunction with processors, etc. It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

Finally, the steps of all methods described herein can be performed in any suitable order unless otherwise indicated herein or otherwise clearly contradicted by context. The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention as defined by the following claims. Therefore, the scope of the invention is defined not by the detailed description of the invention but by the following claims, and all differences within the scope will be construed as being included in the invention.

What is claimed is:

1. A digital image processing method comprising: obtaining photographing setting information from an input image;
    obtaining one or more candidate images corresponding to the obtained photographing setting information from a first database that stores a plurality of candidate images according to at least one of a candidate image photographing setting information and a plurality of image effects;
    determining photographing control setting information for a selected candidate image from the obtained one or more candidate images from a second database that stores photographing control setting information corresponding to the plurality of candidate images;
    generating a first capture image according to the determined photographing control setting information;
    storing the first capture image;
    generating a second capture image by applying a predetermined photographing setting information; and
    storing the second capture image, wherein the photographing control setting information comprises at least one of an aperture value, a sensitivity value, a shutter speed value, flash information, and photometric information, and
    wherein the first capture image and the second capture image are obtained by capturing a same subject and are stored in different groups.

2. The method of claim 1, further comprising displaying the obtained one or more candidate images.

3. The method of claim 2, further comprising selecting any one of the displayed one or more candidate images by a user.

4. The method of claim 2, further comprising:
    determining the one or more candidate images according to photographer information from a third database that stores candidate images according to candidate image photographer information; and
    displaying the photographer information from the third database.

5. The method of claim 2, further comprising:
    obtaining place information; and
    determining another one or more candidate images comprising a plurality of pieces of composition information corresponding to the obtained place information from a third database that stores candidate images comprising the respective plurality of pieces of composition information according to the place information.

6. The method of claim 5, further comprising:
    selecting any one of the determined other one or more candidate images; and
    providing photographing composition information corresponding to the selected any one of the determined other one or more candidate images.

7. The method of claim 6, wherein the providing of the photographing composition information of the selected candidate image comprises displaying the photographing composition information.

8. The method of claim 5, further comprising determining the other one or more candidate images comprising the respective plurality of pieces of composition information corresponding to the obtained place information from a fourth database that stores candidate images according to photographer information.

9. The method of claim 8, further comprising:
selecting any one of the determined other one or more candidate images; and
providing photographing composition information of the selected any one of the determined other one or more candidate images.

10. The method of claim 1, further comprising determining priorities of the one or more candidate images according to a similarity between the obtained photographing setting information and the candidate image photographing setting information of the first database.

11. The method of claim 10, further comprising selecting any one of the one or more candidate images according to the priorities.

12. The method of claim 11, further comprising selecting any one of the obtained one or more candidate images according to the priorities by a user.

13. The method of claim 10, further comprising displaying the priorities.

14. The method of claim 1, further comprising:
storing photographing setting information corresponding to the first capture image and the first capture image as a candidate image in the first database; and
storing photographing control setting information regarding the first capture image and the first capture image in the second database.

15. The method of claim 1, further comprising accessing a server comprising at least one of the first database and the second database.

16. The method of claim 1, wherein the photographing setting information comprises scene information and one or more candidate images corresponding to the scene information from the first database.

17. The method of claim 1, further comprising:
generating a preview image to which the photographing control setting information is applied; and
displaying the preview image.

18. The method of claim 1, wherein the photographing setting information comprises at least one piece of information selected from the group consisting of subject information, color information, face information, and exposure information.

19. A digital image processing method comprising:
obtaining photographing setting information from an input image;
obtaining one or more candidate images corresponding to the obtained photographing setting information from a first database that stores a plurality of candidate images according to at least one of a candidate image photographing setting information and a plurality of image effects;
determining photographing control setting information for a selected candidate image from the obtained one or more candidate images from a second database that stores photographing control setting information corresponding to the plurality of candidate images;
generating a first capture image according to the determined photographing control setting information;
storing the first capture image;
generating a second capture image by applying a predetermined photographing setting information; and
storing the second capture image,
wherein the photographing control setting information comprises at least one of an aperture value, a sensitivity value, a shutter speed value, flash information, and photometric information, and
wherein the first capture image and the second capture image are obtained by capturing a same subject and are stored in different groups.

20. A digital image processing apparatus comprising:
a photographing setting information obtaining unit that obtains photographing setting information from an input image;
a candidate image determining unit that determines one or more candidate images corresponding to the obtained photographing setting information from a first database that stores a plurality of candidate images according to at least one of candidate image photographing setting information and a plurality of image effects;
a photographing control setting information determining unit that determines photographing control setting information corresponding to a selected candidate image from the determined one of the one or more candidate images from a second database that stores photographing control setting information corresponding to the plurality of candidate images;
a capture image generating unit that generates a first capture image by applying the determined photographing control setting information and generates a second capture image by applying a predetermined photographing setting information; and
a storing unit that stores the first capture image and the second capture image, wherein the photographing control setting information comprises at least one piece of an aperture value, a sensitivity value, a shutter speed value, flash information, and photometric information; and
wherein the first capture image and the second capture image are obtained by capturing a same subject and are stored in different groups.

21. The digital image processing apparatus of claim 20, further comprising a display unit that displays the determined one or more candidate images.

22. The digital image processing apparatus of claim 21, further comprising:
a manipulation unit that inputs a manipulation signal from a user; and
a selection unit that selects any one of the displayed one or more candidate images according to the manipulation signal.

23. The digital image processing apparatus of claim 21, wherein the candidate image determining unit determines the one or more candidate images according to photographer information from a third database that stores candidate images according to candidate image photographer information; and the display unit displays the determined photographer information.

24. The digital image processing apparatus of claim 20, further comprising a priority determining unit that determines priorities of the determined one or more candidate images according to a similarity between the determined photographing setting information and the photographing setting information of the first database.

25. The digital image processing apparatus of claim 24, further comprising a selection unit that selects any one of the determined one or more candidate images according to the priorities.

26. The digital image processing apparatus of claim 24, further comprising a display unit that displays the priorities.

27. The digital image processing apparatus of claim 26, further comprising a selection unit that selects any one of the displayed candidate images according to a manipulation signal.

28. The digital image processing apparatus of claim 20, wherein the digital image processing apparatus stores photographing setting information corresponding to the first capture image and the first capture image as a candidate image in the first database, and stores photographing control setting information regarding the first capture image and the first capture image in the second database.

29. The digital image processing apparatus of claim 20, further comprising a communication unit that accesses a server comprising at least one of the first database and the second database.

30. The digital image processing apparatus of claim 20, further comprising:
a place information determining unit that determines place information, wherein the candidate image determining unit determines another one or more candidate images comprising a plurality of pieces of composition information corresponding to the determined place information from a third database that stores candidate images comprising the respective plurality of pieces of composition information according to the place information.

31. The digital image processing apparatus of claim 30, further comprising a selecting unit that selects any one of the determined other one or more candidate images.

32. The digital image processing apparatus of claim 31, wherein the display unit displays at least one piece of the plurality of pieces of composition information.

33. The digital image processing apparatus of claim 30, wherein the candidate image determining unit determines the other one or more candidate images comprising the respective plurality of pieces of composition information corresponding to the obtained place information from a fourth database storing candidate images according to candidate image photographer information.

34. The digital image processing apparatus of claim 33, further comprising a selection unit that selects any one of the determined other one or more candidate images, wherein the display unit displays photographer information of the selected candidate image.

35. The digital image processing apparatus of claim 22, wherein the photographing setting information comprises scene information, and the candidate image determining unit determines one or more candidate images corresponding to the scene information from the first database.

36. The digital image processing apparatus of claim 22, further comprising:
a preview image generating unit that generates a preview image to which the photographing control setting information is applied; and
a display unit that displays the preview image.

37. The digital image processing apparatus of claim 20, wherein the photographing setting information comprises at least one piece of information selected from the group consisting of subject information, color information, face information, and exposure information.

38. A digital image processing apparatus comprising:
a photographing setting information obtaining unit that obtains photographing setting information from an input image;
a candidate image determining unit that determines one or more candidate images corresponding to the obtained photographing setting information from a first database that stores a plurality of candidate images according to at least one of candidate image photographing setting information and a plurality of image effects;
a photographing control setting information determining unit that determines photographing control setting information corresponding to a selected candidate image from the determined one of the one or more candidate images from a second database that stores photographing control setting information corresponding to the plurality of candidate images;
a capture image generating unit that generates a first capture image by applying the determined photographing control setting information and generates a second capture image by applying a predetermined photographing setting information; and
a storing unit that stores the first capture image and the second capture image,
wherein the photographing control setting information comprises at least one piece of an aperture value, a sensitivity value, a shutter speed value, flash information, and photometric information, and
wherein the first capture image and the second capture image are obtained by capturing a same subject and are stored in different groups.

\* \* \* \* \*